(12) United States Patent
Churquina

(10) Patent No.: US 7,356,501 B2
(45) Date of Patent: Apr. 8, 2008

(54) INTEGRATED PRICE AND VOLUME DISPLAY OF MARKET TRADED SECURITIES USING PRICE-VOLUME BARS

(76) Inventor: Eduardo Enrique Churquina, 8537 Southwestern Blvd., Apt. 2173, Dallas, TX (US) 75206

( * ) Notice: Subject to any disclaimer, the term of this patent is extended or adjusted under 35 U.S.C. 154(b) by 1405 days.

(21) Appl. No.: 10/056,125

(22) Filed: Jan. 24, 2002

(65) Prior Publication Data

US 2003/0139989 A1  Jul. 24, 2003

(51) Int. Cl.
*G06Q 40/00* (2006.01)
(52) U.S. Cl. .................. 705/37; 705/26; 705/27; 705/35; 705/36; 705/37; 705/38
(58) Field of Classification Search .................. 705/26, 705/27, 35, 36, 37, 38
See application file for complete search history.

(56) References Cited

U.S. PATENT DOCUMENTS

| | | | |
|---|---|---|---|
| 5,347,452 A | 9/1994 | Bay, Jr. | |
| 5,880,726 A | 3/1999 | Takiguchi et al. | |
| 6,272,474 B1 * | 8/2001 | Garcia | 705/36 R |
| 6,993,504 B1 * | 1/2006 | Friesen et al. | 705/37 |
| 2001/0014874 A1 | 8/2001 | Iida et al. | |

FOREIGN PATENT DOCUMENTS

| | | |
|---|---|---|
| EP | 1 109 122 A2 | 6/2001 |
| WO | WO 01/75733 A1 | 10/2001 |

OTHER PUBLICATIONS

Steven B. Achelis, Equivolume, Technical Analysis from A to Z, 2000, online document: http://www.equis.com/free/taaz/equivolume.html.
Steven B. Achelis, Introduction—Charts, Technical Analysis from A to Z, 2000, online document: http://www.equis.com/free/taaz/intcharts.html.
Mark Etzkorn, Ed., What Works in Online Trading, 2001, pp. 53-57, 77-90, John Wiley & Sons, Inc, New York.
Alan S. Farley, The Master Swing Trader, 2001, pp. 26-35, McGraw-Hill, New York.
Thomas P. Drinka, Technical Analysis Primer, Chapter 6:CBOT Market Profile® and Liquidity Data Bank®, Department of Agriculture Western Illinois University, online document http://www.wiu.edu/users/miag/facstaff/tpd/tutorial:htm, Sections 1 to 5.

* cited by examiner

*Primary Examiner*—Nga Nguyen

(57) ABSTRACT

A method and system for providing trading volume information of selected market traded securities compiling aggregated volume of transactions executed within each pre-selected price bracket for each pre-selected discrete time interval. The data is displayed using price-volume bars incorporated into a price-volume chart. In this manner traders can compare the relative volume of transactions occurred at substantially narrow price brackets for each discrete time interval.

12 Claims, 10 Drawing Sheets

PRICE-VOLUME BARS EMBODIMENTS

PRICE-VOLUME CHART

BAR CHART

CANDLESTICK CHART

EQUIVOLUME CHART

CANDLEVOLUME CHART

MARKET PROFILE CHART

EP 1 109 122 A2

PRICE-VOLUME BARS EMBODIMENTS

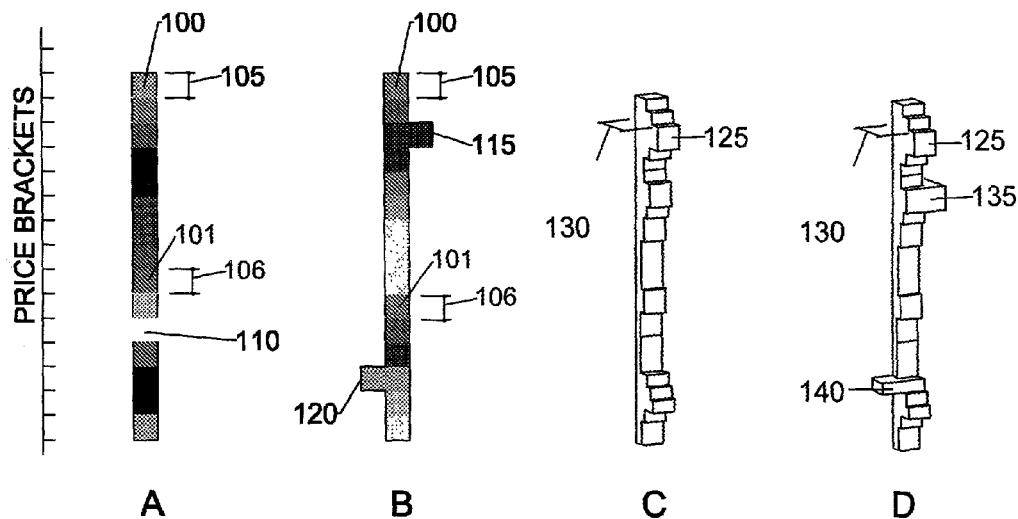
PRICE-VOLUME BARS EMBODIMENTS
FIG. 8
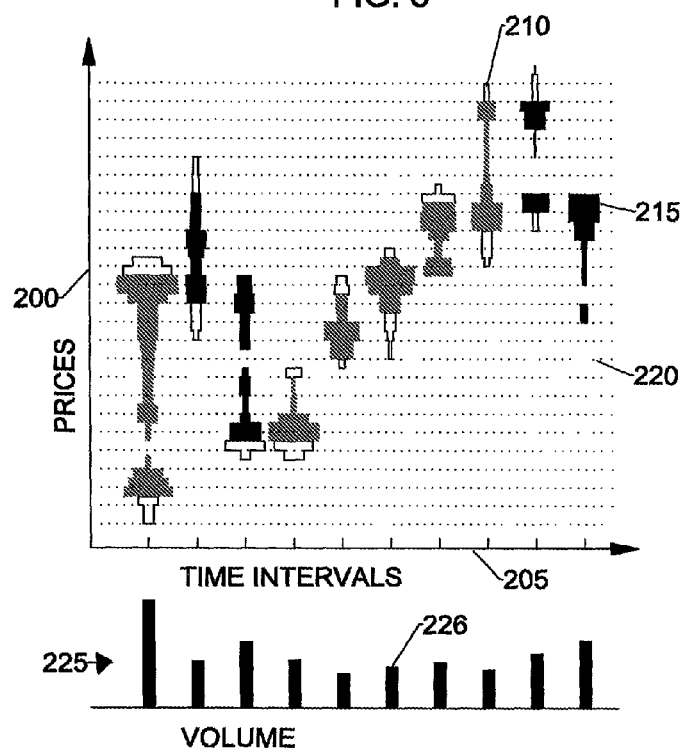
FIG. 9 PRICE-VOLUME CHART

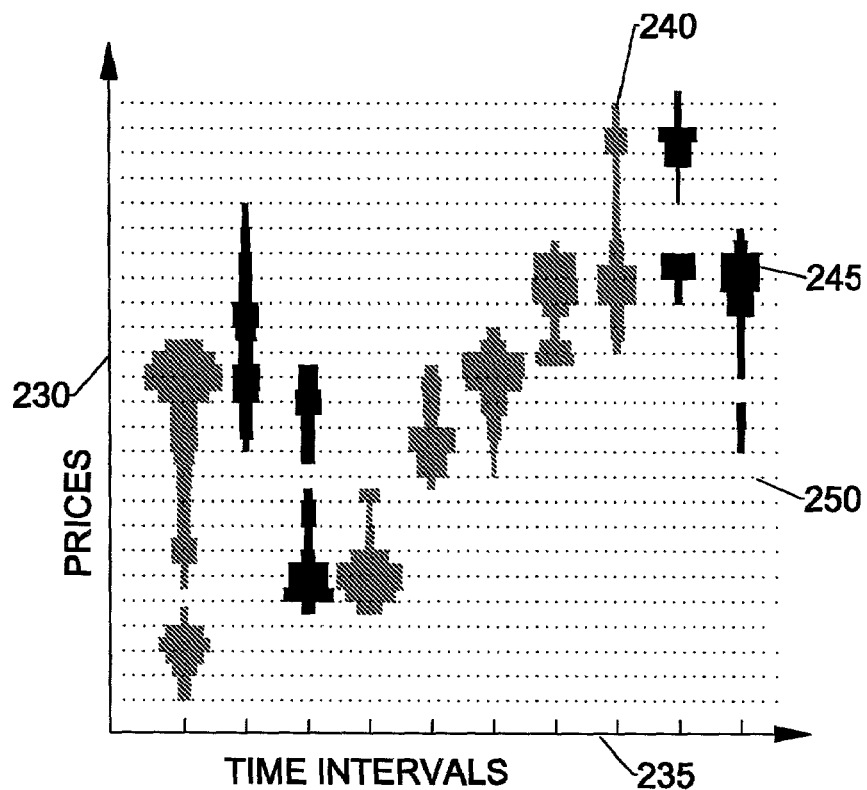
FIG. 10 PRICE-VOLUME CHART
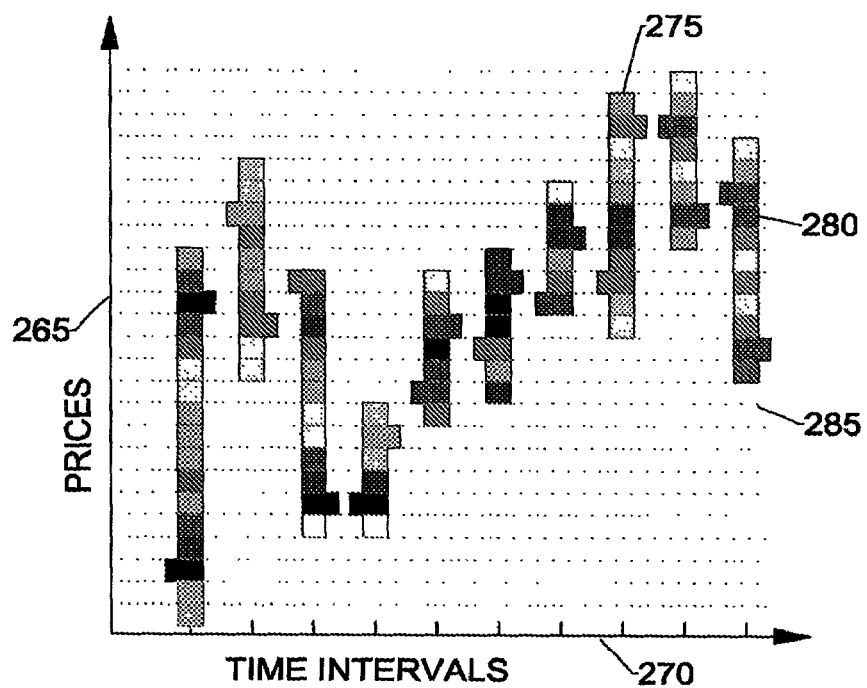
FIG. 11 PRICE-VOLUME CHART

FIG. 13 TIME AND VOLUME PARSER

INTEGRATED PRICE AND VOLUME DISPLAY OF MARKET TRADED SECURITIES USING PRICE-VOLUME BARS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of Invention

This invention relates to market traded securities such as stocks, currency contracts, bonds, commodities and futures contracts, and more particularly to a charting system and computer implementation for displaying trading activity of those securities by identifying the volume of transactions at each price bracket for each time interval within a price-time chart comprising a discrete number of price brackets and a discrete number of time intervals.

2. Description of Prior Art Computer System Architecture

Client-server architecture: An environment in which the application processing is divided between client workstations and servers. It implies the use of user terminal computers (clients) interacting with servers in a network in contrast to processing everything in a single computer system. In client-server environments, the client can perform some or all of the application processing. In an intranet/Internet environment the server can be either file or data server providing data to be processed by clients, or an application server, providing data and process services to clients. Also known as clients and servers are the independent processes running client and server services. These processes can even reside in the same computer, so the same computer can be a server and a client at the same time.

Stand alone computer architecture: an environment where computer processes are completed locally without connecting to a server.

3. Description of Prior Art Transaction Data

Company shares, commodities contracts, bonds, and commodities and equities futures contracts are listed and traded in exchanges. Exchanges use either open outcry method or proprietary electronic networks to negotiate transactions.

There are also alternative trading systems into the market, such as electronic communication networks (ECNs). ECNs provide electronic facilities that investors can use to trade directly with each other.

Financial market trading information is provided by the stock exchanges, ECNs, and a multitude of financial data providers. Typical data provided for executed transactions are time of sale, price of sale, and volume of such transaction. The ticker symbol, company or security name, and date of transaction may be included in the data provided or is implicit in the data request. This individual transaction data is collectively known as "Time and Sales Data".

Compiled transaction data for individual stocks is available as open, high, low, and close price for transactions occurred during predetermined discrete time periods, and the total volume transacted for such discrete periods. A multitude of indicators calculated from the above data are available to show price and volume trends of selected stocks.

Exchanges, ECNs, and vendors provide market data either stored in a physical media, or through data feeds using computer networks such as the Internet. Data feeds are said to be real-time when transaction information is transmitted or made available with minimal delay from the moment it is generated or entered into transaction systems. Otherwise it is know as delayed data. Typical delays for such data are usually 15 or 20 minutes.

Price and volume information is often presented in a chart form. All charts depict price changes over time, and most of them have a vertical axis showing a price scale and a horizontal axis showing a timeline.

The timeline varies according to longer or shorter time perspectives. Typically, data is presented for a discrete number of equal time intervals, each interval ranging from 1 minute to 1-year periods and beyond. Typical time intervals are 1 minute, 5 minutes, 15 minutes, 30 minutes, 60 minutes, daily, monthly, and annually. Transaction volume information is often included together with price charts, either as a separated chart, or included in chart calculation.

Technical analysis is the study of price and volume charts to understand market activity and predict future price trends. The most basic concept of technical analysis is support and resistance. Support is a price level that acts as a floor preventing prices from dropping below that level. Resistance is a price level that acts as a ceiling, preventing prices from rising higher.

Traders have different trading strategies, time horizons, and risk tolerance for their trades. The prices at which traders sell current stock positions have a direct relationship to the price at which they bought such stock, as it will determine the profit or loss of that particular trade. The reverse is true for short sales.

Traders have different trading styles ranging from day traders that execute trades lasting minutes and looking for small percentage profit, to mid or long term investor looking for a larger percentage profit over longer periods of time.

Increased trading volume tends to occur in narrow price brackets. These increased volume price brackets influence future levels of support and resistance, as such brackets will be the point of profit or loss for an increased number of traders. My research indicates that when prices near price brackets with past increased volume, those price brackets become likely areas of increased support and resistance.

Narrow price brackets with increased volume might occur more than once in a selected time frame, even if this time frame is intra-day. Trading occurs in a stepped motion between price brackets with more volume, these steps occurring at least several times a day. For actively traded stocks these steps may occur several times in an hour period.

It is imperative to know and compare the trading volume at each price bracket, looking at different time frames. Traders with this knowledge will be able to improve market analysis and better determine levels of support and resistance.

Many attempts have been made at graphically displaying concurrently transaction price and volume over variable periods of time. However there is no system currently in use that can display graphically trading volume occurring at narrow price brackets.

My invention details a method and charting system to accomplish just that, using price-volume bars to graphically show over any time frame the price brackets with more or less transaction volume, thus providing vital information to traders.

4. Description of Prior Art OHLC Price Charting

Open, high, low, and close (OHLC) charts are the most widely used charting system today. Most charts represent prices in the ordinate axis and a set of equal time periods in the abscissa axis. For each time period bar charts (FIG. 1) represent price action with a vertical bar plotting four price points: high and low at the ends of the bar, open and close with two dashes at each side of the bar.

Japanese candlesticks (FIG. 2), or simply candlestick charts, represent the open price and close price at the ends of a segment known as the body. If the open is lower than the close the body is usually hollow, and if the close is lower than the open the body is drawn black or solid. If the low or high prices are beyond the bracket between the open and close, they display as lines above and below the body. These are known as upper shadow and lower shadow.

OHLC charts make sense when each bar corresponds to each market day where there is a defined open and close price. During market hours trading is executed in a continuum, thus any selection of intra-day time interval renders arbitrary and meaningless open and close prices.

5. Description of Prior Art Transaction Volume Charting

Histogram chart: The most common way to represent transaction volume is a histogram at the bottom of the OHLC chart, each histogram bar corresponding to each time interval in the OHLC chart. The length of the bar represents the total transaction volume for each period. There is no way to discriminate prices with more and less volume, so this vital information is lost to traders.

U.S. Pat. No. 6,272,474, Aug. 7, 2001 to Garcia recognizes the importance of volume on market analysis. The invention proposes Bid/Ask trade bars as a mean to identify trades conducted at ask prices, bid prices, and prices between both. It represents volume as single bar concurrent with each time interval. Each bar has segments showing the executions at bid, ask, and in between. Although being an improvement from traditional volume histograms charts, representing volume with a single bar per period does not show traders the vital volume-per-price information required to improve market analysis.

U.S. Patent Application 20010014874, Aug. 16, 2001 to lida et al. refers to a graph showing pending orders ordered vertically above and below the current trading price. This vertical axis represents prices of pending orders and the number of shares of each orders displayed as triangles at each side of this vertical bar. Although it intends to portray some price action it refers only to pending orders, no executed transactions, and thus allocates only one bar for each ticker traded. Also since it is constantly changing to show varying bid and ask offers it does not produce a chart spanning a time interval, and thus is unable to display market action over time. Essentially it is a graphical display of the NASDAQ Level II screen, a typical trader screen showing a list of pending bid and ask limit orders for a selected stock. Moreover, since it is a display of current offers, not executions, does not span a time frame and cannot show trading history.

U.S. Pat. No. 5,347,452 to Bay, Jr. provides a visual display of current trading volume and cumulative average trading volume for securities. It improves from previous volume display including the average volume bars next to current volume bars to determine deviation from average volumes that will denote larger price moves. Again, like traditional histograms and some of the previous art reviewed above, it fails to discriminate the prices at which volume occurs, thus missing this valuable information.

FIG. 3 shows an Equivolume chart, developed by Richard W. Arms, Jr. Arms developed a chart system to show trading volume integrated with a price chart. Equivolume charts are composed of one box for each discrete price interval. The top of the box is the high price and the bottom the low price for the period. The width of the box is proportional to the total volume of transactions during the period. In this way traders get a direct graphic input to compare market volume for selected stocks during the timeframe considered. Candle-volume charts are similar to Equivolume charts, but incorporate the upper and lower shadow of traditional candlestick charts to Equivolume boxes. Although both methods are an improvement as they integrate volume and price data, they fail as in the previous examples, to show the prices with more or less transaction volume within each time interval. This is particularly important for longer intervals. In essence, they present the same information as traditional OHLC charts plus histogram, but coupled in a Cartesian system.

J. Peter Steidimayer developed the Market Profile system for charting commodities prices. FIG. 5 shows a typical Market Profile chart. Market Profile charts are daily charts divided in 30 minutes intervals. For each interval the method identifies the price or prices with at least one transaction, using a different letter for each interval. The goal of the method is to identify prices that have traded for longer periods of time. Alternatively it provides a tick volume total for a selected period. This is a big advantage over previous charts, but still does not supply a multiple-bar type traders are accustomed to. It neither has the facility of setting price brackets beyond tick price, a very important feature in widely ranging markets such as stock markets. This method, although a big step forward, still falls short of filling the our goal easy to read and flexible chart.

European Patent 1 109 122 A2, 20.06.2001 to Li and Chong: System For Charting Financial Market Activity. In FIG. 6 Li and Chong present a system for augmenting a conventional candlestick price-time chart for technical analysis of securities price movement. The system is characterized by means of analyzing the trading activity data to determine for each discrete time interval a price bracket with substantially low trading activity or the highest trading activity. It also graphically identifies price brackets at the ends of the lower and upper shadow with minimal trading activity. The market activity compilation is done by time or volume means. Li and Chong proposed a very interesting system superimposing one element of volume data to traditional candlestick charting to identify the price bracket with highest activity or substantially lower activity. As said above, fluctuations in transaction price and corresponding volume are complex, and cannot be accurately and completely depicted representing volume averages or single points of peak activity. Li and Chong system still falls short of the goal of showing a comprehensive picture of trading volume for all price brackets for any discrete time frame.

Consequently, there is a need for a data processing system capable of showing a complete picture of trading volume in a per-price manner for any chosen time frame, and present it in a integral yet easily readable graphical chart. Furthermore, the system should be able to function with historical and real-time data to allow intra-day or long-term market analysis.

BRIEF SUMMARY OF THE INVENTION

Accordingly, it is a primary object of my invention to provide market participants with a more complete market activity information on selected market traded securities, compiling and displaying volume information in a per-price basis.

The advantage of my invention is to provide traders with trading volume information of selected securities for each of pre-selected substantially narrow price brackets for each of pre-selected discrete time intervals, and display them in a graphical manner to convey a more accurate depiction of trading activity.

My invention presents data using price-volume bars that allow traders to easily asses the cumulative volume for each substantially narrow price bracket and time interval, thus enabling them to better establish likely levels of support and resistance. Future technical analysis developments can use this information to further evaluate market activity and predict market trends.

Time and Sales Data is obtained either in a storage media or online from financial service providers or stock exchanges. This data can be real-time or-delayed.

This data is compiled for each of a number of pre-selected price brackets for each of a number of pre-selected discrete time intervals. This is done by first separating all transactions executed during each time interval, and adding the total volume for each predetermined price bracket. The result is a table with 1 column for each time interval and 1 row for each price bracket, and each cell containing the total volume for each price bracket for each time interval. Each price bracket is either the minimum price increment/decrement allowed by the exchange where the security is traded, or may be a fraction of the difference between the high and low price of the data set being compiled. In the later case, determination of price brackets can be done either by simply dividing such difference or by using other mathematical formulae. In any case several price brackets should be determined to allow for a more refined data presentation.

The data is presented in a traditional price-time chart, with prices in the ordinate axis and a timeline in the abscissa axis. For each time interval a price-volume bar is displayed. Each price-volume bar is segmented, each segment substantially corresponding to each price bracket. Each segment is graphically depicted to show its corresponding aggregated volume in a manner that allows comparison with other segments and their corresponding volumes.

The data processing and charts display can be implemented in a stand-alone or client-server computer system environment.

BRIEF DESCRIPTION OF THE SEVERAL VIEWS OF THE DRAWING

FIG. 8: Price-volume Bar embodiments.
FIG. 9: Price-volume Chart embodiment using price-volume bar from FIG. 7-C.
FIG. 10: Price-volume Chart embodiment using price-volume bar from FIG. 7-A.
FIG. 11: Price-volume Chart embodiment using price-volume bar from FIG. 8-B.

DETAILED DESCRIPTION OF THE INVENTION

Figure 1:
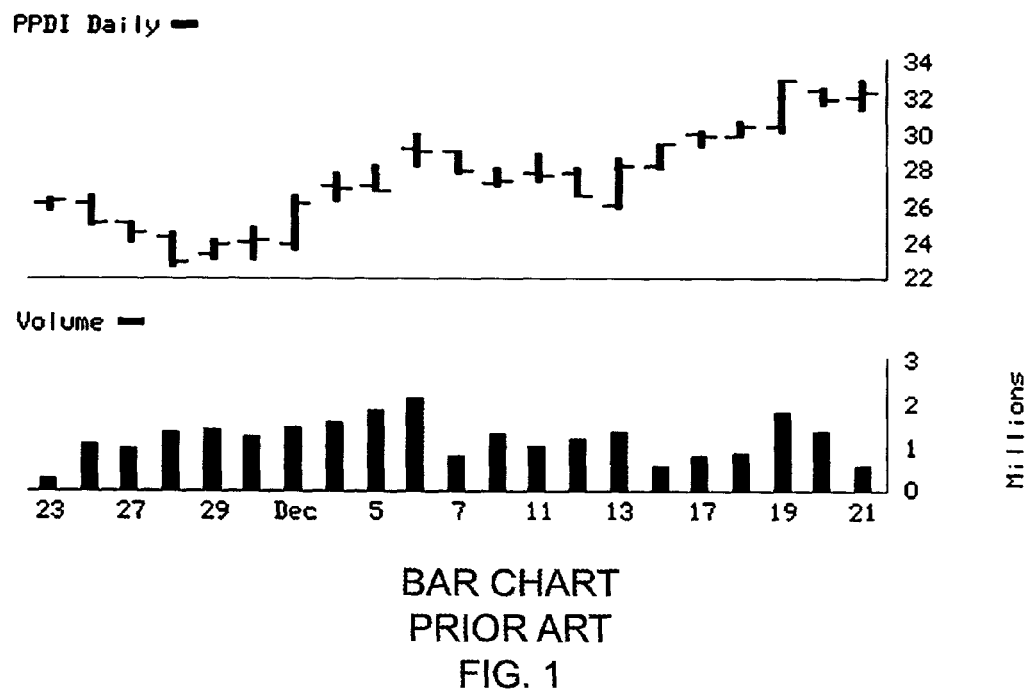
FIG. 1: Prior Art Bar Chart with volume histogram.
Figure 2:
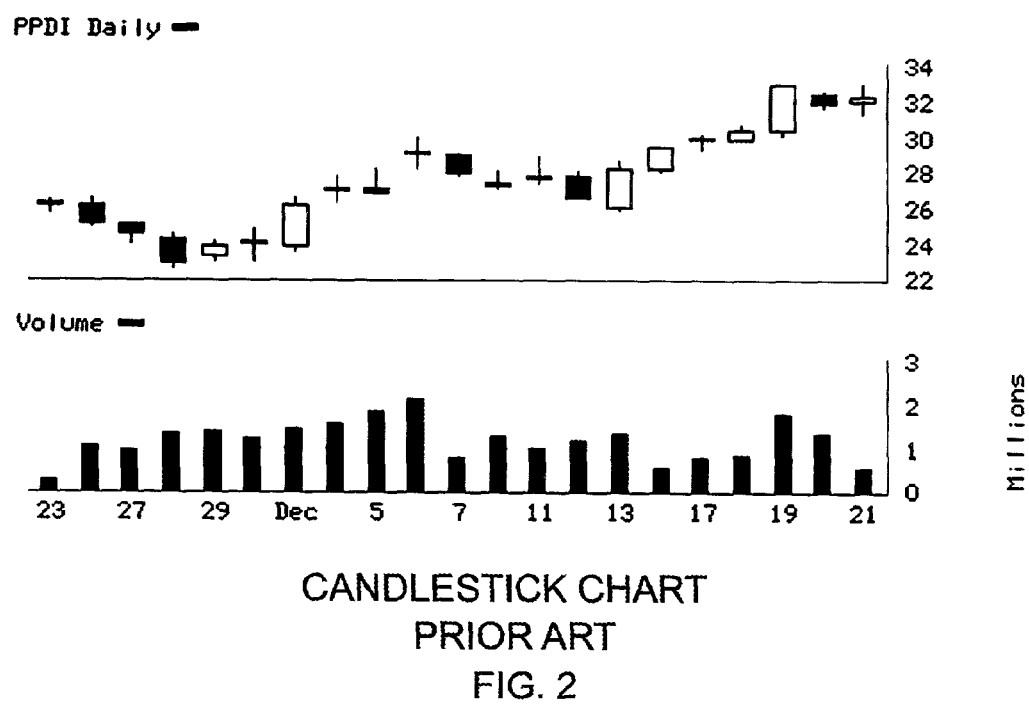
FIG. 2: Prior Art Candlestick Chart with volume histogram.
Figure 3:
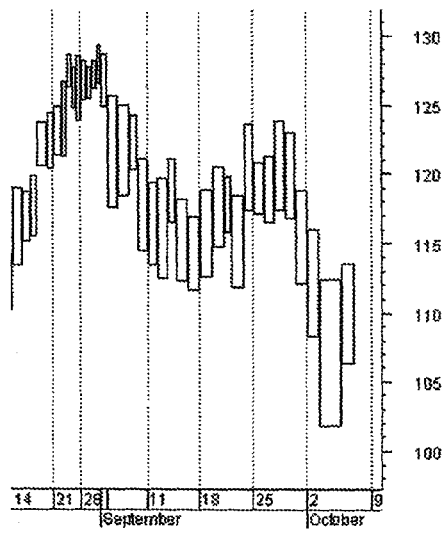
FIG. 3: Prior Art Equivolume Chart.
Figure 4:
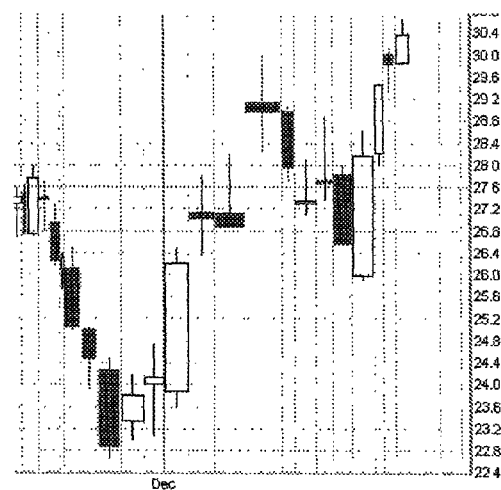
FIG. 4: Prior Art Candlevolume Chart.
Figure 5:
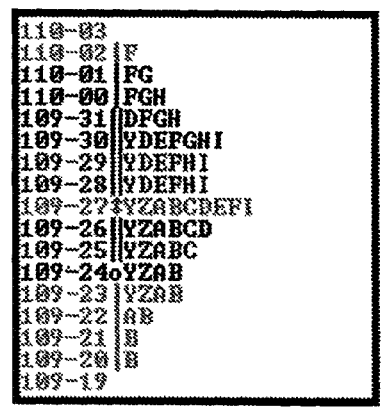
FIG. 5: Prior Art Market Profile chart.
Figure 6:
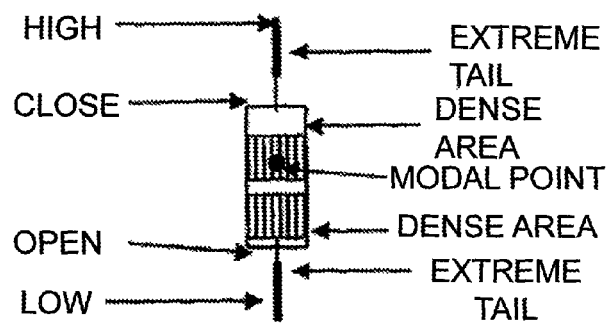
FIG. 6: Prior Art EP 1 109 122 A2 chart.

It is a primary object of my invention to provide market participants with a more complete market activity information on selected market traded securities, compiling and displaying volume information in a per-price basis.

The advantage of my invention is to provide traders with trading volume information of selected market-traded securities for each of pre-selected substantially narrow price brackets for each of pre-selected discrete time intervals, and display them in a graphical manner to convey a more accurate depiction of trading activity.

My invention presents data using price-volume bars that allow traders to asses the cumulative volume for each substantially narrow price bracket and time interval, thus enabling them to better establish likely levels of support and resistance. Future technical analysis developments can use this information to further evaluate market activity and predict market trends.

For all subsequent description market security is used to refer to market traded securities such as stocks, currency contracts, bonds, and commodities, options, and futures contracts. Time and Sales Data comprising time, price, and volume of transactions is provided by exchanges, financial data providers, or ECNs. For all subsequent description the term "volume" refers to either number of shares traded, dollar amount of transactions, number of contracts traded, or open interest of futures and commodities, and the term "Time and Sales Data" will refer to transaction information as provided by exchanges or authorized data vendors, and comprising said time, price, and volume of individual transactions. Time and Sales Data can be received either in a data storage media or online through a suitable computer network connection from financial service providers or exchanges. Online data can be either "real-time" data or "delayed" data, as commonly defined and provided by the exchanges and vendors.

The Time and Sales Data online data feed can comprise information on one or more market securities. Each market security is referred to by its own unique ticker. For all subsequent description "ticker" is used to refer to a specific market security, i.e. shares of a specific company. If information on more than one ticker received intermixed, the data needs to be first separated and stored by ticker.

Figure 7:
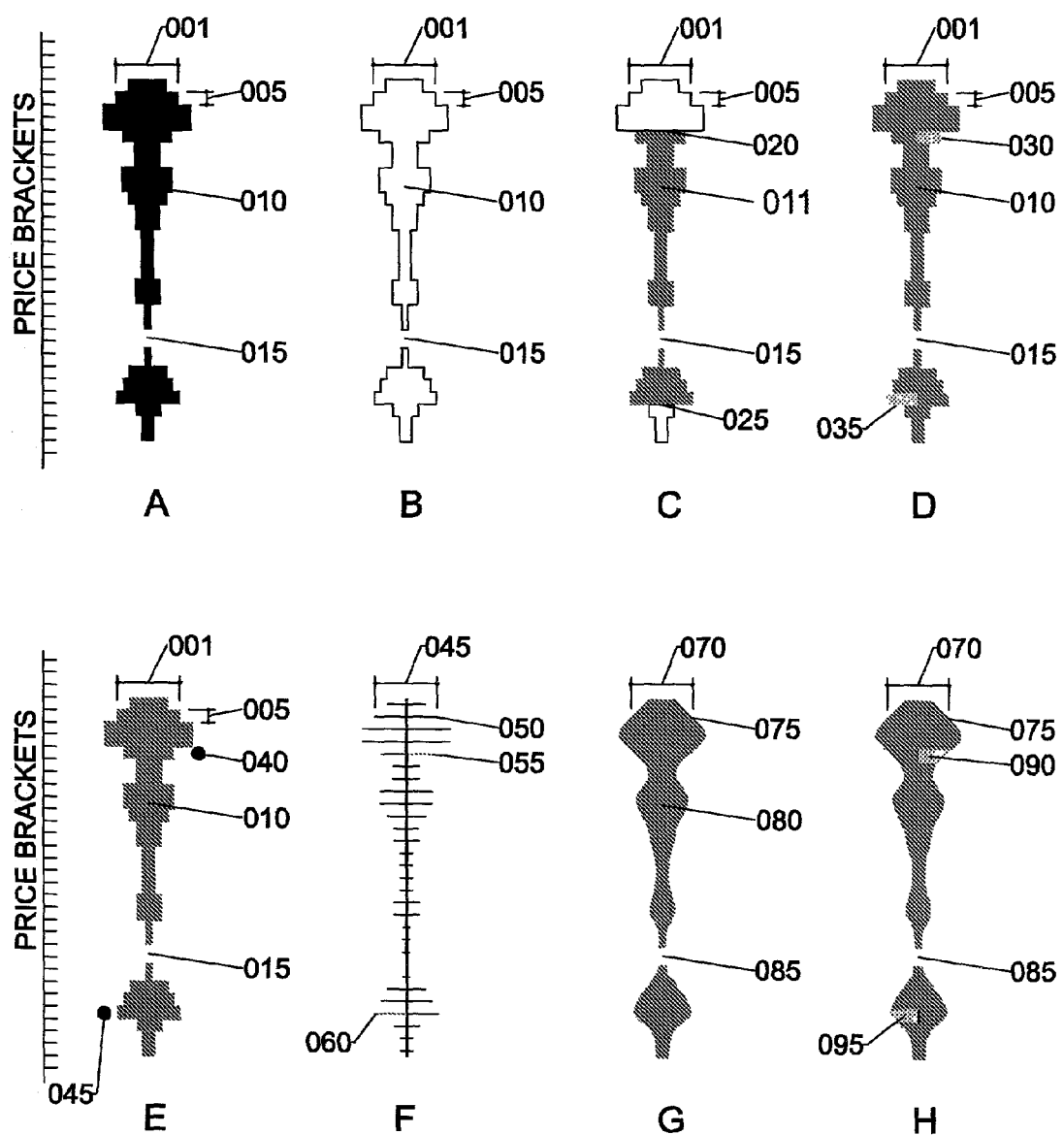
FIG. 7: Price-volume Bar embodiments.

The method of the present invention is now presented:

a) Establish a set of time intervals compatible with available Time and Sales Data: Time intervals can be of equal different lengths, and can be set by the user through a pre-defined user interface or a pre-selected time intervals may be used.

b) Establish a set of price brackets compatible with available Time and Sales Data: Each price bracket being equal to or bigger than the minimum price increment/decrement allowed by the exchange where the market security is traded and being substantially smaller than the difference between the highest and lowest transaction prices of said Time and Sales Data. This method of selecting price brackets should insure that most time intervals have transactions on at least two price brackets. Price brackets can be set by the user through a pre-defined user interface or use a pre-selected price brackets.

c) Compile price-volume table: for each pre-selected time interval obtain the aggregate volume of each price bracket by adding the volume of individual transactions executed at prices within each price bracket and occurred during the pre-selected time interval. Store the resulting data as one total volume per price bracket. Repeat for each pre-selected time interval. The resulting data can be thought off as a table containing rows of pre-selected price brackets and columns of pre-selected time intervals. Each cell of the table contains the aggregate volume of all transactions executed at prices within the corresponding price bracket and executed during the corresponding time interval. For all subsequent description this data table is referred as "price-volume table", and each cell aggregate volume-per-price-bracket-per-time-interval as "VpBpT".

d) Present price-volume data in a chart composed of price-volume bars (FIG. 9, FIG. 10, and FIG. 11): A Cartesian coordinate chart is prepared showing prices corresponding to pre-selected price brackets in the ordinate axis and a time line corresponding to the pre-selected time intervals in the abscissa axis. Draw one price-volume bar substantially corresponding to each time interval in the abscissa axis. FIG. 7 and FIG. 8 show price-volume bar embodiments, described below. Each price-volume bar represents the market action on that particular time interval. Each price-volume bar is segmented, each segment substantially corresponding to each price bracket in the ordinate axis that has transaction activity for the time interval represented by the price-volume bar. Each segment represents its corresponding VpBpT by changing one or more graphic properties such as segment dimensions, shape, color, hue, saturation or luminosity proportionately to its corresponding VpBpT. In this manner traders can compare relative volume for each segment and thus compare relative volumes for each price bracket for each time interval. FIG. 7 AND FIG. 8 show price-volume bar embodiments.

Description of Price-Volume Bar Embodiments

FIGS. 7-A, 7-B, 7-C, 7-D, and 7-E show price-volume bar embodiments. On each of those figures the price-volume bar is composed of segments, where each segment VpBpT is proportionately represented by the segment width, substantially corresponding to each price bracket in the ordinate axis. Thus, price bracket 005 has a relative volume represented by the its width 001, price bracket 006 has a relative volume represented by its segment width 002, and so on for each price bracket. Bar segments 015 with null or comparably very small VpBpT can be represented with the chart background color, have a thin line, or dotted line. The bar body 010 color represents the market trend by varying one or more of hue, saturation, or luminosity between up trending bars (open lower than close for time interval), and down trending bars (open higher than close for time interval).

In this manner it is possible to easily identify price brackets with more or less volume for each time interval.

FIG. 7-A and FIG. 7-B show the simplest form of the price-volume bar, with no indication of open and close price.

FIG. 7-C shows a partially shaded price-volume bar indicating its open and close price. The top 020 of shaded area 011 correspond to the opening price of a down trending bar or the close price of a up trending bar, and bottom 025 of shaded area 011 correspond to the close price of a down trending bar or the open price of a up trending bar.

FIG. 7-D shows a price-volume bar indicating its open and close price. The segment 030 colored or shaded differently than body 010 and drawn in the right hand side of the bar correspond to the close price, and segment 035 colored or shaded differently than body 010 and drawn in the left hand side of the bar correspond to the open price.

FIG. 7-E shows a price-volume bar indicating its open and close price by means of marks external to the price-volume bar and substantially aligned with the open and close prices. Mark 040 on the right hand side of the bar indicates its close price, while mark 045 on the left hand side of the bar indicates its open price. A dot is shown, but other types of geometric marks can be used.

FIG. 7-F shows another embodiment of a price-volume bar indicating its open and close price. The bar is composed of an axis 044 substantially parallel the ordinate axis, an a series of segments, one for each price bracket and substantially parallel to the abscissa axis, to represent each price bracket VpBpT. Thus the price bracket corresponding to segment 050 has a relative volume represented by the segment length 045, and so on for all price brackets. A differently shaded or colored optional half segment 055 on the right hand side of the bar axis correspond in the ordinate axis to the close price for the interval, while a similar optional half segment 060 in the left hand side of the bar axis correspond to the open price.

FIG. 7-G and FIG. 7-H show other embodiments of a price-volume bar. On each of those figures each price bracket VpBpT is plotted substantially aligned with corresponding price bracket in the abscissa axis, and a curve is fitted through those points. Thus, the width of the bar at any point such as 070 represents approximately the VpBpT for the point 075 and its corresponding price bracket in the ordinate axis. Bar segments 085 with null or comparably very small VpBpT can be represented with the chart background color, a thin line, or dotted line. The bar body 080 color represents the market trend by varying one or more of hue, saturation, or luminosity between up trending and down trending bars On FIG. 7-H the segment 090 colored or shaded differently than body 080 and drawn in the right hand side of the bar correspond to the close price, and segment 095 colored or shaded differently than body 080 and drawn in the left hand side of the bar correspond to the open price.

FIG. 8-A and FIG. 8-B show other embodiments of a price-volume bar. On each of those figures a price-volume bar is plotted as series of aligned segments, each segment substantially corresponding to each price bracket on the ordinate axis. Each segment color, such as 100, represents the VpBpT of corresponding price bracket 105, segment color 101 represents the VpBpT of corresponding price bracket 106, and so on. The difference in color between segments is achieved by varying one or more of hue, saturation, or luminosity. Bar segment 110 with null or comparably very small VpBpT can be represented with the chart background color.

On FIG. 8-B the bar segment 115 corresponding to the price bracket including the close price is extended outwards to the right of the bar, and segment 120 corresponding to the price bracket including the open price is extended outwards to the left of the bar. Alternatively, segments 115 and 120 can be narrower than a single price bracket to indicate more precisely the open and close prices.

FIG. 8-C and FIG. 8-D show simulated 3-dimensional embodiments of a price-volume bar. On each of those figures a price-volume bar is drawn as series of simulated 3-dimensional aligned segments, each segment substantially corresponding to each price bracket on the ordinate axis. Each segment such as 125 has a simulated depth 130 proportional to the corresponding price bracket VpBpT. To further enhance volume comparison, any or all segment's simulated faces can be colored with a technique similar to price-volume bar shown in FIG. 8-A.

On FIG. 8-D the bar segment 135 corresponding to the price bracket including the close price is extended outwards to the right of the bar, and segment 140 corresponding to the price bracket including the open price is extended to the left of the bar. Alternatively, segments 135 and 140 can be narrower than a single price bracket to indicate more precisely the open and close prices

Description of Preferred Price-Volume Chart Embodiment

FIG. 9 shows the preferred embodiment of a price-volume chart. The Cartesian system has an abscissa axis 205 showing the time line corresponding to transaction dates and times of the data being represented. The ordinate axis 200 represents prices corresponding to pre-selected price brackets. FIG. 9 shows a 10-period chart. A single price-volume bar, such as 210 or 215, is plotted for each pre-selected time interval. Optional guide lines 220 may be plotted. The chart shows the price-volume bar embodiment as shown in FIG. 7-C. Up trending and down trending price-volume bars are shaded differently. Bar 210 is an up trending bar, while bar 215 is down trending. Each bar indicates its open and close price as described for FIG. 7-C.

An optional traditional volume histogram 225 may be plotted, showing the total volume for each time interval by means of bars 226, proportional in length to its total interval volume.

This embodiment clearly shows the prices and corresponding volumes in an integrated form. It shows much more information than previous art charts, in an integrated and clear way.

It is possible to see at glance price brackets with more or less market activity for each time interval, and thus, enhance market activity analysis and trend forecast. This type of charting actually simplifies and improves technical analysis of price charts by showing volume-per-price information. Compared to traditional OHLC charts it is possible to reduce the number of intervals required to show market activity within a given time span, and consequently, provide for a better understanding of market activity without a glut of information.

Description of Alternate Price-Volume Chart Embodiment

FIG. 10 shows an alternate embodiment of a price-volume chart. The Cartesian system has an abscissa axis 235 showing the time line corresponding to transaction dates and times of the data being represented. The ordinate axis 230 represents prices corresponding to pre-selected price brackets. FIG. 10 shows a 10-period chart. A single bar, such as 240 or 245, is plotted for each pre-selected time interval. Optional guide lines 250 may be plotted. The chart shows the price-volume bar embodiment as shown in FIG. 7-A. Up trending and down trending price-volume bars are shaded differently. Bar 240 is an up trending bar, while bar 245 is down trending. Indication of open and close price for each price-volume bar (not shown) can be achieved by means shown on FIG. 7-E. Optionally, the chart may include a traditional volume histogram 225, as shown in FIG. 9, displaying the total volume for each time interval by means of bars 226, proportional in length to the corresponding total interval volume.

FIG. 11 shows another embodiment of a price-volume chart. The Cartesian system has an abscissa axis 270 showing the time line corresponding the transaction date and time of the data being represented. The ordinate axis 265 represents prices corresponding to pre-selected price brackets. FIG. 11 shows a 10-period chart. A single bar, such as 275 or 280, is plotted for each pre-selected time interval. Optional guide lines 285 may be plotted. The chart shows the price-volume bar embodiment as shown in FIG. 8-B. Bar 275 is an up trending bar, while bar 280 is down trending. Up trending and down trending price-volume bars may or may not be colored differently. Optionally, the chart may include a traditional volume histogram 225, as shown in FIG. 9, displaying the total volume for each time interval by means of bars 226, proportional in length to the corresponding total interval volume.

Detailed Description of Computer System Implementation

Figure 12:
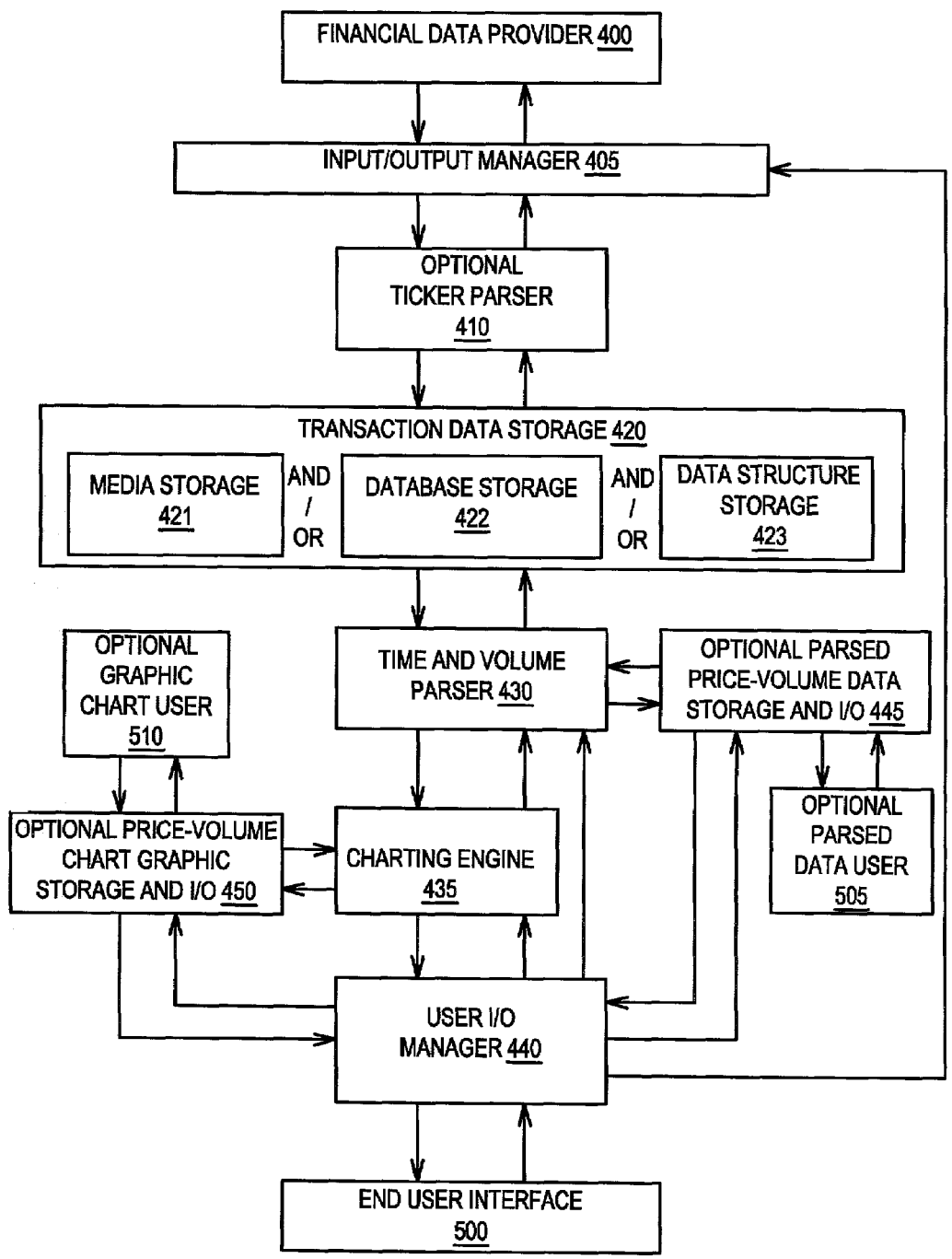
FIG. 12: Flow chart illustrating a computer system to implement price-volume charts.

FIG. 12 shows a block diagram the computer implementation of the method described above.

Time and Sales Data is obtained from Financial Data Provider 400. This data contains a list of transaction data comprising time, price, and volume of transactions. This data may be furnished recorded in data storage media or obtained online through a network connection in a know manner compatible with provider's computer systems and protocols. If the data is provided through a network connection the type of data can be either what is know in the business as "real-time" or otherwise can be "delayed" data.

The data is received by Input/Output Manager 405 which implement the communication protocol and route in and out data flow between Financial Data Provider 400 and the rest of the processing modules. Implementation of input/output manager 405 is dependent on protocols and data formats used to communicate, and should be compatible with and documented by Financial Data Provider 400. Other function of input/output manager 405 is to communicate with Transaction Data Storage 420, and decide if data requested by end users should be obtained from Transaction Data Storage 420 or Financial Data Provider 400.

Optional Ticker Parser 410 is required if the data obtained from Financial Data Provider 400 is not segregated by ticker. In such case Optional Ticker Parser 410 will parse data and separate it by ticker.

Parsed Time and Sales Data is stored in Transaction Data Storage 420. It comprises one or more of Media Storage 421, Database Storage 422, and/or Data Structure Storage 423. Media Storage 421 can be any or more of media storage such as disc or memory modules. Database Storage 422 can be any database system or database service currently available, either integrated or remotely located. Data Structure Storage 423 is any computer language dependent data structure used to store values. These structures such as list, trees, containers, etc. are programming language specific and detailed in the corresponding language and library specification.

Time and Volume Parser 430 parses Time and Sales Data into volume-per-price for each pre-selected price bracket. It obtains and stores VpBpT totals associated with each price bracket for each time interval.

Optionally, VpBpT and its associated price bracket and time interval data can be stored in Optional Parsed Price-Volume Data Storage and I/O 445 for later use.

Charting Engine 435 generates Price-Volume Charts using VpBpT data obtained from Time and Volume Parser 430. Means and techniques to create the graphic images are platform and programming language dependent. This technology is well known and documented by programming software and systems vendors.

Optionally, graphic chart data can be stored in Optional Price-Volume Chart Graphic Storage and I/O 450 for later use.

User I/O Manager 440 receives charting data and route it to End User Interface 500 for display.

The end user through End User Interface 500 can change some or all charting parameters and request an updated display to User I/O Manager 440, who in turn can check the availability of such information from different sources to save processing and connecting time. Such sources can be:

Optional Price-Volume Chart Graphic Storage and I/O 450 (if implemented) to verify if a chart is stored that matches the user request, in which case is retrieved and send to End User Interface 500.

Optional Parsed Price-Volume Data Storage and I/O 445 (if implemented). If parsed data is available it is passed to Charting Engine 435 and then the chart is passed to End User Interface 500.

Transaction Data Storage 420 (link not shown) to verify if Time and Sales Data is in storage. If such data is available it is passed to Time and Volume Parser 430, then to Charting Engine 435 and then the chart is passed to End User Interface 500.

Input/Output Manager 405, to request new data from Financial Data Provider 400, and repeat the parsing-charting process described above and deliver chart to End User Interface 500.

Optionally, VpBpT and its associated price bracket and time interval data can be provided to other users for their own use or for re-distribution. This data is provided stored in media or though a network connection by Optional Parsed Price-Volume Data Storage and I/O 445 to Optional Parsed Data User 505. Network protocols and data formats can be any protocol and format available and compatible with the data being provided. Protocols and formats are platform dependent and documented by its respective vendors.

Optionally, graphic chart data can be provided to other users for their own use or for re-distribution. This data is provided stored in media or though a network connection by Optional Price-Volume Chart Graphic Storage and I/O 450 to Optional Graphic Chart User 510. Network protocols and data formats can be any protocol and format available and compatible with the data being provided. Protocols and formats are platform dependent and documented by its respective vendors.

Optional Parsed Price-Volume Data Storage and I/O 445 and Optional Price-Volume Chart Graphic Storage and I/O 450 may have some or all data request privileges shown and specified for User I/O Manager 440 as described above, and initiate any or all such data processing.

Figure 13:
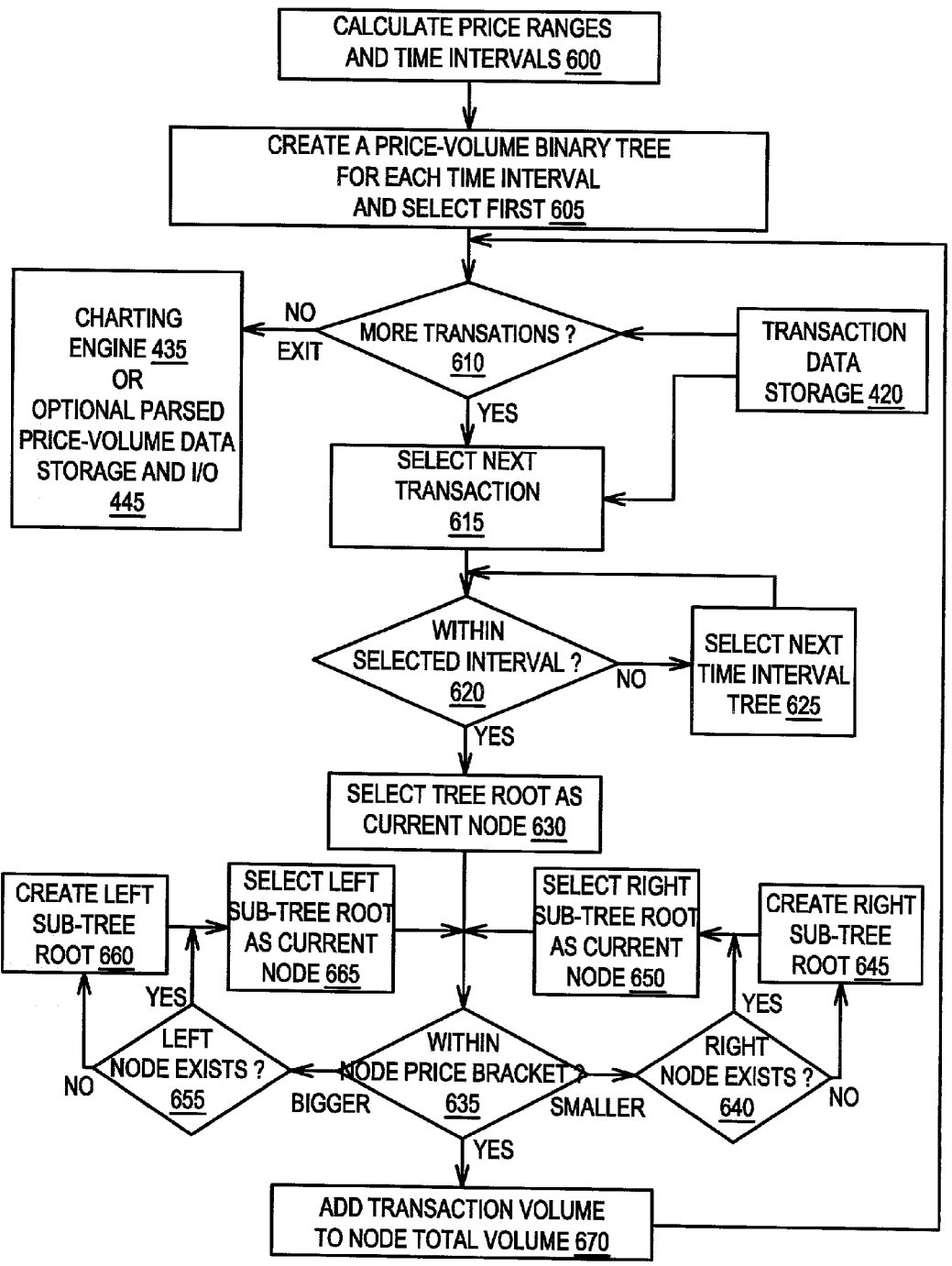
FIG. 13: Time and Volume parser flow chart, to compile Time and Sales data into volume-per-price data.

FIG. 13 shows an implementation of the Time and Volume Parser 430. The diagram shows a binary tree implementation of the parser. Although a binary tree implementation has been chosen for its sorting speed, many other implementations using different sorting algorithms and data structures can be similarly implemented.

Calculate Price Brackets and Time Intervals 600 calculates the set of time intervals and the set of price brackets based on user input or pre-defined parameters.

A price-volume binary tree is created for each time interval in 605. These tree structures can be sub-structures of a container type data structure encompassing all time intervals.

The following process is know as binary search and is well documented in computer science literature. It is shown in the present invention applied to obtaining VpBpT values and construction of the price-volume table. On this implementation each price bracket for each time interval will correspond to a unique node in the tree structure.

More Transactions ? 610 inquires Transaction Data Storage 420 if more transactions corresponding to the requested set are available. Select Next Transaction 615 obtains each transaction data from Transaction Data Storage 420 one at a time and passes it to Within Time Interval 620. 620 verify that transaction time is within currently selected time interval. If it is not, Select Next Time Interval Tree 625 selects the tree corresponding to the next time interval. Within Time Interval 620 checks again to verify that the selected transaction is within selected time interval. This process continues until the transaction time is within current time interval. This shall occur immediately since Time and Sales Data as provided by exchanges is substantially ordered by time.

630 Selects the tree root corresponding to current time interval as the current node. For best results the root should approximately correspond to the middle price bracket of the price-volume bar.

635 test if transaction price is within the price bracket corresponding to current node. If it is, 670 adds the volume of transaction to node's VpBpT quantity. If the transaction price is bigger than current node price bracket, 640 checks if a right node exists. If right node not exists, 645 creates right sub-tree root. On either case, 650 selects the right sub-tree node as current node. The process is back to 635, which in turn checks if the transaction price is within the now current node. If the transaction price is bigger than current node's price brackets the 640-645-650 the process repeats. If the price is smaller than current node price a similar but opposite process takes place for the left hand side of the tree. This process repeats itself until the tree node with a price bracket corresponding to transaction price is found.

When More Transactions ? 610 returns negative, the process exits and pass the price-volume table to Charting Engine 435 or Optional Parsed Price-Volume Data Storage and I/O 445.

Detailed Description of Computer System Architecture

The data processing shown in flow chart of FIG. 12 can be implemented in a standalone or in a client-server system architecture.

In a first embodiment a stand-alone computer system implements all processing modules except Financial Data Provider 400, Optional Parsed Data User 505, and Optional Graphic Chart User 510.

Figure 14:
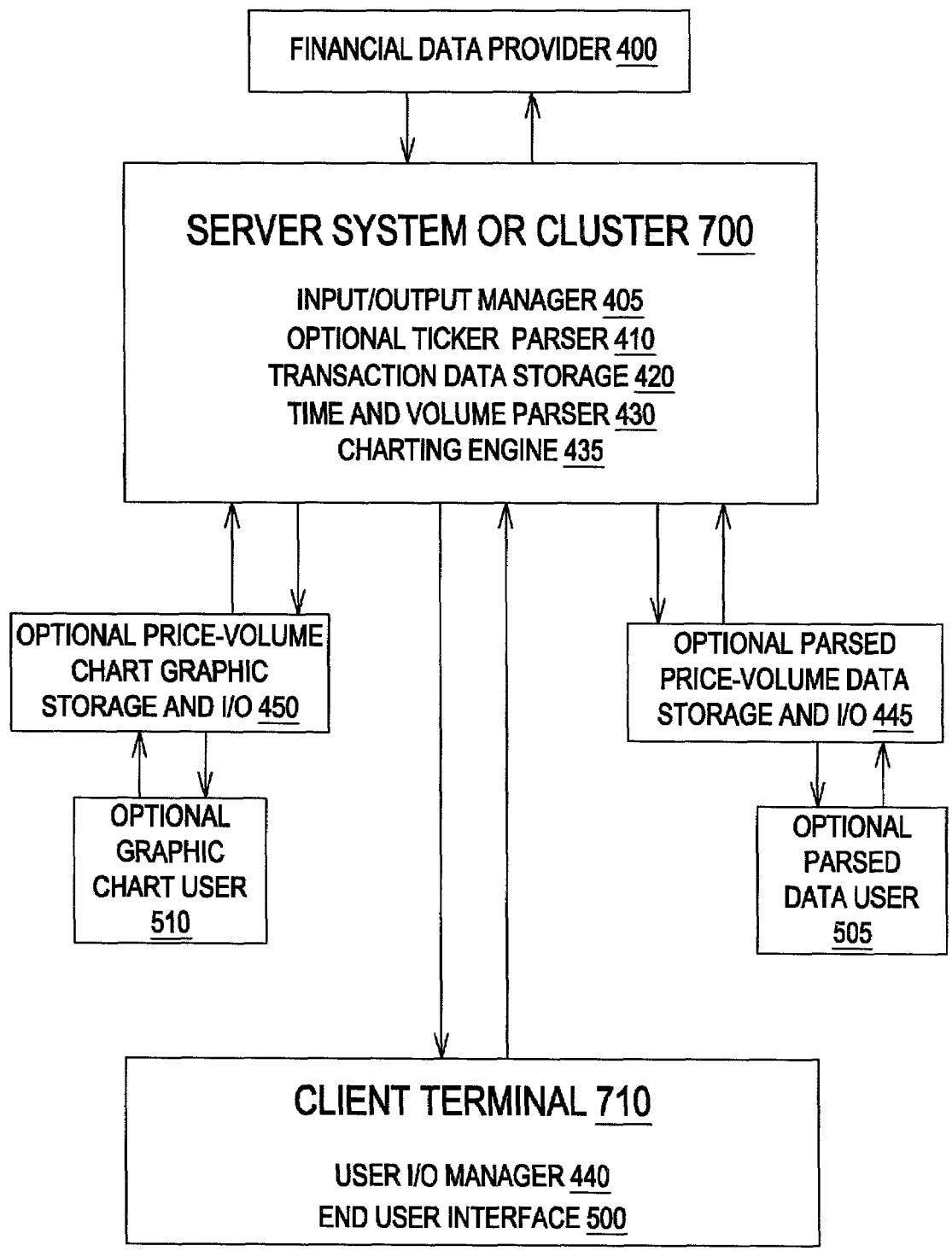
FIG. 14: Flow chart illustrating implementation of price-volume chart system using Client-Server computer architecture.
Figure 15:
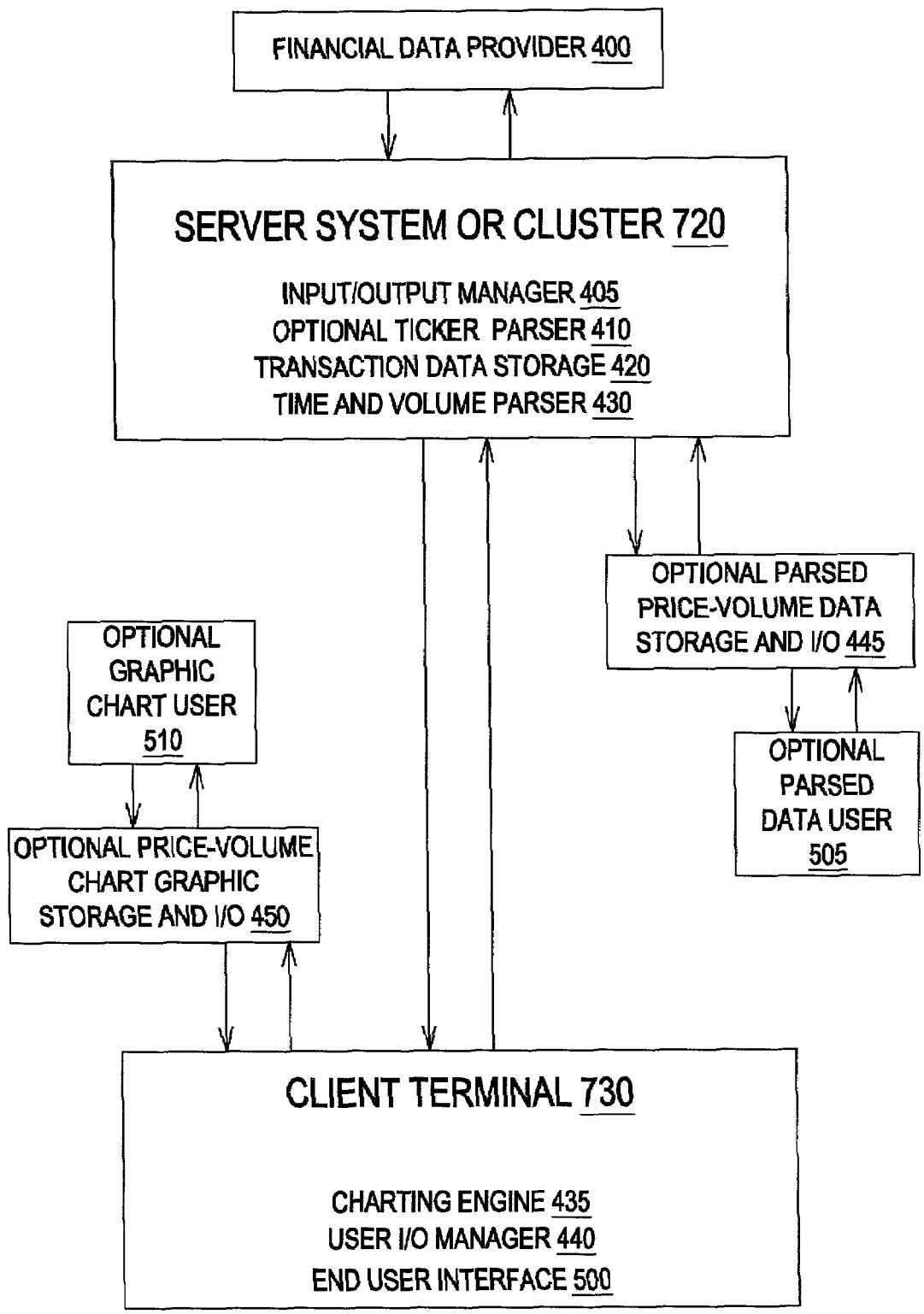
FIG. 15: Flow chart illustrating implementation of price-volume chart system using Client-Server computer architecture.
Figure 16:
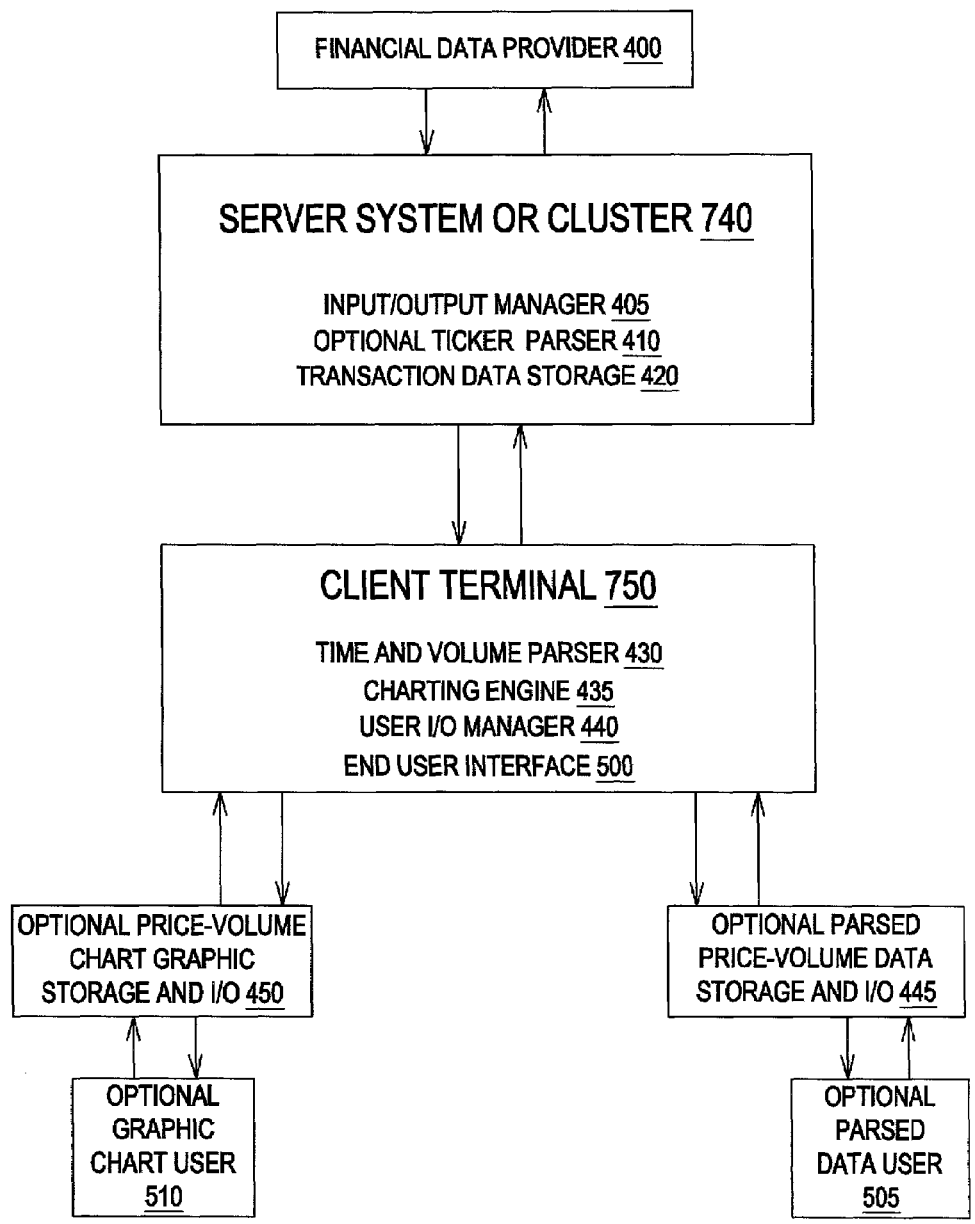
FIG. 16: Flow chart illustrating implementation of price-volume chart system using Client-Server computer architecture.

FIG. 14, FIG. 15, and FIG. 16 show implementations of price-volume chart system using client-server computer system architecture. Data processing and display is divided between a server or servers and a client. Usually, server processes are distributed among several networked computer systems, which can even reside at different locations or belong to different companies that provide data processing and distribution services. This group of systems is identified in the diagrams as server system or cluster 700, 720, and 740. This is commonly known in the industry as n-tier architecture.

Processes 405, 410, 420, 430, 435, 440, 500, and if implemented processes 445, 450, 505, and 510, can be implemented on separated, networked computer systems. One or many such processes may run in the same computer system.

FIG. 14 shows a client-server embodiment of the price-volume chart system. Server system or cluster 700 includes Input/Output Manager 405, Optional Ticker Parser 410, Transaction Data Storage 420, Time and Volume Parser 430, and Charting Engine 435. The Client Terminal 710 includes User I/O Manager 440 and End User Interface 500. This Client Terminal 710 could be a typical graphical browser such as an Internet browser displaying graphical data generated and provided by the server, and providing processing for client request to server, or an application program communicating with a remote server, and having a main function of displaying graphical data and forwarding user requests without significant local data processing. This architecture is also typical for Optional Graphic Chart User 510. Optional Parsed Price-Volume Data Storage and I/O 445 and Optional Chart Graphic Storage and I/I 450 can be implemented integrated to server cluster or remotely, and serve data to Optional Parsed Data User 505.

FIG. 15 shows another client-server embodiment of the price-volume chart system. Server system or cluster 720 includes Input/Output Manager 405, Optional Ticker Parser 410, Transaction Data Storage 420, and Time and Volume Parser 430. The Client Terminal 730 includes Charting Engine 435, User I/O Manager 440 and End User Interface 500. In this embodiment all chart processing is accomplished in the client. Optionally, the client locally or remotely store graphic chart data in Optional Price-Volume Chart Graphic Storage and I/O 450, and may function as a server for other users, such as Optional Graphic Chart User 510. Optional Parsed Price-Volume Data Storage and I/O 445 can be implemented integrated to server cluster or remotely, and serve data to Optional Parsed Data User 505. The client could be a typical Internet browser running an applet or plug-in module for processing parsed data into price-volume charts and displaying graphical chart data, or an application program communicating with a remote server. This architecture is also typical for Optional Parsed Data User 505.

FIG. 16 shows yet another embodiment of the price-volume chart system. Server system or cluster 740 includes Input/Output Manager 405, Optional Ticker Parser 410, and Transaction Data Storage 420. The Client Terminal 750 includes Time and Volume Parser 430, Charting Engine 435, User I/O Manager 440 and End User Interface 500. In this embodiment all price bracket parsing and chart processing is accomplished in the client. Optionally, the client locally or remotely store graphic chart data in Optional Price-Volume Chart Graphic Storage and I/O 450, and may function as a server for other users, such as Optional Graphic Chart User 510. Also optionally, the client locally or remotely store graphic chart data in Optional Parsed Price-Volume Data Storage and I/O 445, and may function as a server for other users, such as Optional Parsed Data User 505. The client could be a typical Internet browser running an applet or plug-in module for processing parsed data into price-volume charts and displaying graphical chart data, or an application program communicating with a remote server.

In another embodiment Optional Graphic Chart User 510 re-distribute the data received with or without further processing.

In yet another embodiment Optional Parsed Data User 505 re-distribute the data received with or without further processing.

What I claim as my invention is:

1. A computer implemented method for providing an integrated display of price and volume of a market traded security comprising the steps of:
   a. receiving trading data of said security comprising price, time, and size of individual trades, and
   b. having a set of consecutive time intervals and a set of preselected price brackets, and
   c. computing a volume per price bracket for each said price bracket for each said time interval, each said volume per price bracket being an aggregate of said sizes of said trades executed at prices within the corresponding said price bracket and executed during the corresponding said time interval, and
   d. displaying the resulting data in a chart comprising a set of sequential price-volume bars, each said price-volume bar corresponding to one said time interval, and
   e. each said price-volume bar having graphical means for proportionately representing said volume per price bracket of each said price bracket, whereby traders considering said chart can compare trading volumes between said price brackets occurred during said time intervals, and therefore gain an enhanced knowledge of trading activity of said security.

2. The method of claim 1 wherein said market traded security is a security selected from the group consisting of stocks, futures contracts, options contracts, bonds, commodities, currencies, currencies contracts, certificates of deposit, notes, option puts, option calls, annuities, funds, unit investment trusts, and T-bills.

3. The method of claim 1 wherein up trending price-volume bars are shown different than down trending price-volume bars by means of different color.

4. The method of claim 1 wherein said price-volume bars have means for showing the open and close prices for corresponding said time interval.

5. The method of claim 1 wherein each said price-volume bar is segmented, each segment corresponding to one said price bracket and said segment horizontal dimension is proportional to said volume per price bracket of corresponding said price bracket.

6. The method of claim 1 wherein the horizontal dimension of said price-volume bar is proportional to said volume of corresponding said price bracket.

7. The method of claim 5 wherein said segments corresponding to said price brackets within the range of prices between the open and close prices for the corresponding said time interval are colored differently than segments outside said range of prices between open and close prices.

8. The method of claim 1 wherein each said price-volume bar is segmented, each segment corresponding to one said price bracket and each said segment representing the volume per price bracket of its corresponding said price bracket by varying said segment color.

9. The method of claim 1 wherein each said price-volume bar is displayed as a segmented simulated 3-dimensional figure.

10. The method of claim 1 implemented on a client-server computer system.

11. The method of claim 10 where the client is an Internet browser.

12. A computer-implemented method for providing trading information of a market traded security comprising the steps of:
- a) receiving trading information comprising time, price, and size of each trade, and
- b) having a set of user selected consecutive time intervals and a set of preselected price brackets, and
- c) computing an aggregate volume per each said price bracket per each said time interval, said aggregate volume being a sum of said sizes of said trades with a said price within the corresponding said price bracket and with said time within the corresponding said time interval, and
- d) delivering the resulting data over a network, and
- e) using said resulting data as input to a trading analysis computer program, whereby traders using said computer programs gain an enhanced knowledge of trading activity of said market traded security.

* * * * *